United States Patent [19]

Goutzoulis

[11] Patent Number: 5,101,455
[45] Date of Patent: Mar. 31, 1992

[54] RECIRCULATING BINARY FIBEROPTIC DELAY LINE APPARATUS FOR TIME STEERING

[75] Inventor: Anastasios P. Goutzoulis, Pittsburgh, Pa.

[73] Assignee: The United States of America as represented by the Secretary of the Air Force, Washington, D.C.

[21] Appl. No.: 691,778

[22] Filed: Apr. 26, 1991

[51] Int. Cl.[5] ............................................. G02B 6/28
[52] U.S. Cl. ........................... 385/24; 250/227.12; 359/127; 359/195; 359/115; 359/173; 385/27
[58] Field of Search .............. 350/96.15, 96.16, 96.29, 350/96.30; 370/1-3; 455/608-613; 250/227.12

[56] References Cited

U.S. PATENT DOCUMENTS

| | | | |
|---|---|---|---|
| 3,368,202 | 2/1968 | Crousel | 340/172.5 |
| 4,028,702 | 6/1977 | Levine et al. | 343/100 SA |
| 4,166,212 | 8/1979 | Judeinstein | 350/96.16 X |
| 4,267,590 | 5/1981 | Bosotti | 370/3 |
| 4,427,895 | 1/1984 | Eng | 455/610 X |
| 4,671,604 | 6/1987 | Soref | 350/96.15 |
| 4,671,605 | 6/1987 | Soref | 350/96.15 |
| 4,714,314 | 12/1987 | Yang et al. | 350/96.20 |
| 4,725,844 | 2/1988 | Goodwin et al. | 342/374 |
| 4,814,773 | 3/1989 | Wechsberg et al. | 342/368 |
| 4,814,774 | 3/1989 | Herczfeld | 342/372 |
| 4,832,433 | 5/1989 | de La Chapelle et al. | 350/96.15 |

OTHER PUBLICATIONS

"Integrated-Optic Delay Line Signal Processor", B. Lagerstroem et al, OFC/IOOC, p. 176, 1987, paper wk-2.

Primary Examiner—John D. Lee
Attorney, Agent, or Firm—William Stepanishen; Donald J. Singer

[57] ABSTRACT

A recirculating binary fiberoptic delay line apparatus having a programmable optical delay line to delay multiplexed optical signals which are at different wavelengths. An optical demultiplexer separates the delayed multiplexed signals according to wavelength and provides two portions of each separated signal. One portion is applied to the elements of an array antenna and the other portion is detected by wavelength in a detector bank to obtain the delay modulation signal which modulates laser diodes, each at a different optical wavelength, in a laser diode bank to provide a number of delayed optical signals at different wave-lengths. The delayed optical signals are multiplexed together and applied to the optical delay line for recirculation through the apparatus to generate a greater number of delay signals.

5 Claims, 1 Drawing Sheet

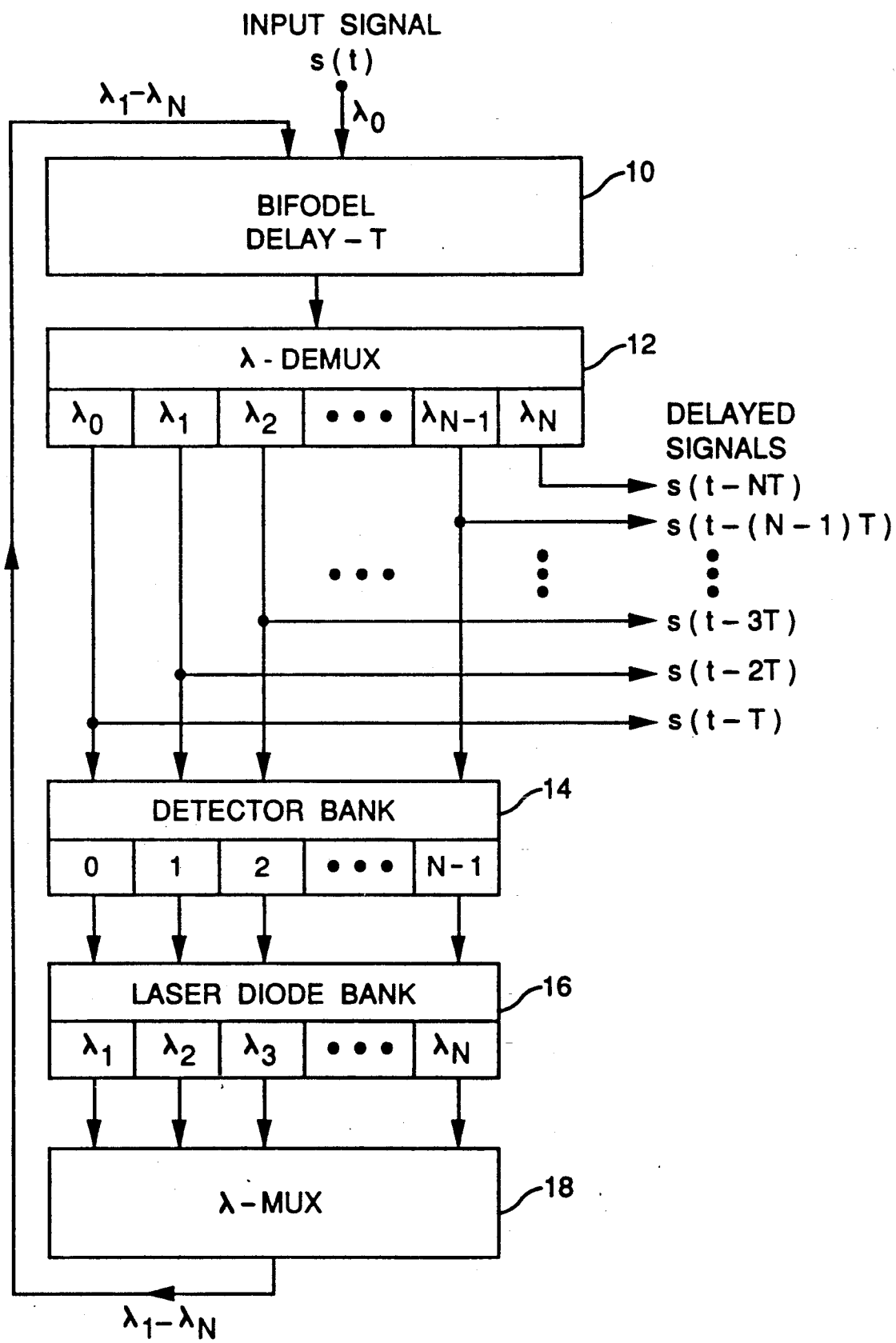

RECIRCULATING BINARY FIBEROPTIC DELAY LINE APPARATUS FOR TIME STEERING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to an optical delay line apparatus and, more particularly, to a recirculating binary fiberoptic delay line apparatus for time steering of array antennas.

The state of the art of optical delay line apparatus is well represented and alleviated to some degree by the prior art apparatus and approaches which are contained in the following U.S. Patents:

U.S. Pat. No. 3,368,202 issued to Crousel on 6 Feb. 1968;

U.S. Pat. No. 4,671,604 issued to Soref on 9 June 1987;

U.S. Pat. No. 4,671,605 issued to Soref on 9 June 1987;

U.S. Pat. No. 4,714,314 issued to Yang et al on 22 Dec. 1987;

U.S. Pat. No. 4,725,844 issued to Goodwin et al on 16 Feb. 1988;

U.S. Pat. No. 4,814,773 issued to Wechsberg et al on 21 Mar. 1989;

U.S. Pat. No. 4,814,774 issued to Herczfeld on 21 Mar. 1989., and

U.S. Pat. No. 4,832,433 issued to de La Chapelle et al on 23 May 1989.

The Crousel patent is directed to a memory core matrix and simple delay means like magnetic drum apparatus or sonic delay lines in place of the complicated interconnection network, summation equipment and shift registers which are employed in a multibeam receiving system.

The Soref patent ('604) describes a wavelength dependent, tunable, optical time delay system for electrical signals having a conversion/tuning unit for converting an incoming electrical signal into an optical signal as well as selectively varying the wavelength of the optical signal. By selectively varying the wavelength of the optical signal, the electrical signal can effectively and rapidly time delayed as desired in response to the electronic signal.

The Soref patent ('605) is directed to a length dependent, optical time delay/filter device for electrical signals made up of a plurality of optical fibers of varying lengths. Depending upon which fibers an optical signal (converted from an incoming electrical signal) passes through determines the time of travel of the optical signal through the device, and as a result thereof is time delayed.

The Yang et al patent discloses a mode dependent, optical time delay system for electrical signals having a highly multi-mode optical fiber having a step index profile in optical alignment with an optical source which is capable of converting an incoming electrical signal into an optical signal.

The Goodwin et al patent discusses a technique for applying selected phase delays to an optical carrier signal, the phase delays being referenced to a radio-frequency (rf) subcarrier signal. The optical signal to be phase delayed is introduced into a phase delay network comprising multiple optical paths and multiple electro-optical switches, controllable by signals generated in switching logic. The selected delays can be introduced for purposes of data modulation, or for steering an antenna beam in a phased-array antenna.

The Wechsberg et al patent describes a fiber optic feed network for a radar which couples the antenna with the transmitting and receiving circuitry. The feed system includes a set of optical multiplexers interconnected by sets of optical fibers. Microwave energy of the radar is converted to optical radiation for communication to the antenna, and then converted back to the microwave energy.

The Herczfeld patent discloses an optically controlled phased array antenna system and method of operating same utilizing fiber optic transmission lengths and controlled piezo-electric crystals or equivalent elements to introduce predetermined time delays into each light signal by controlling the respective length of each fiber optic link. The light carrying fibers are wrapped around the respective crystals in accordance with a pattern to introduce time delays corresponding to the amount of stretch given to the fiber by the energized crystals. Beam scanning is achieved by controlling the matrix of crystals to introduce appropriate time delays into the optical signals which drive the respective antenna elements.

The de La Chapelle et al patent is directed to a fiber-optic feed network using series/parallel connected light emitting optic-electronic components, such as laser diodes for distributing RF, microwave, MMW, digital signals, and pulse modulated light. The diodes are selected in number and impedance to provide a good-wideband impedance match to the RF/microwave/MMW/digital driving source.

Much effort has been devoted for the development of efficient fiberoptic delay line architectures that can provide a programmable delay over a wide range of delays. The most efficient such architecture is the binary programmable fiberoptic delay line (BIFODEL). In the binary programmable fiberoptic delay line the microwave signal to be delayed, linearly modulates the intensity of a laser diode. The resultant optical signal, is then routed through M fiber segments. Each fiber segment has a length that is equal to twice the length of its right neighbor. The length of the smallest or rightmost fiber segment is such that the delay which it introduces corresponds to the desired delay resolution $T_o$. Selection of the fiber segments, through which the signal is routed, can be achieved by means of M 2×2 optical switches. Each switch allows the signal to enter or to bypass a specific fiber segment. Thus, by selecting the states of the switches, a delay T may take any value (in increments of $T_o$) that is equal to or less than the maximum value which is equal to $$T_{max} = (2^M - 1)T_o \qquad (1.0)$$

After the signal has been routed through the proper fiber segments, it is detected and subsequently buffered and further processed. It may be noted that the importance of the binary programmable fiberoptic delay line comes because the total number of delays that can be generated is equal to $2^M$, and thus, with a small number of fiber segments, a very large number of delays can be generated, e.g., for M=10 we have 1024 possible delays.

In a one dimensional antenna array with K elements, the maximum time delay required by the ith element is given by $$T_{imax} = d_i \sin\theta_M / c,  \quad (1.1)$$

where $d_i$ is the distance of the ith element from the 0th or reference element, c is the speed of light and $\theta_M$ is the maximum angle (with respect to boresight) that the antenna might be steered to. For an isotropic one dimensional array with element-to-element distance of $d = \lambda/2$, where $\lambda$ is the wavelength of the RF radiation, Equation 1.1 becomes $$T_{imax} = i\lambda \sin\theta_M / 2c, \quad (1.2)$$

Equation 1.2 indicates that the maximum delay for $\theta_M$ is different for each of the K elements. In a similar manner, it can be shown that the delay resolution is different for each element, and is proportional to $$T_{imin} = i\lambda \sin\theta_o / 2c, \quad (1.3)$$

where $\theta_o$ is the steering angle resolution. It is worthwhile to examine an example in order to understand the rather severe delay line requirements for a one dimensional antenna. Let us assume that $K=101$, $\lambda=0.3$ m (i.e., L-band or $f=1$ GHz), $\theta_M=45^*$, and $\theta_R=0.176^*$. For this scenario and for each element we require a binary programmable fiberoptic delay line with M cascaded delay stages, where M is equal to $$M = \log_2(45/0.176) = 8 \quad (1.4)$$

It is important to note that the delay and delay resolution characteristics of the binary programmable fiberoptic delay line are different for each element. For example, for the first element we require a maximum delay of 0.35 nsec with a resolution of 1.54 psec, for the 10th element we require a maximum delay of 3.5 nsec and a resolution 15.4 psec, and for the 100th element we require 35 nsec maximum delay with 154 psec resolution.

The above discussion clearly indicates that a different binary programmable fiberoptic delay line is required for each array element. Note that a similar situation exists with 2-D antennas as well, with the hardware complexity requirement being proportional to $K^2$, where KxK are the array dimensions. This situation is obviously impractical because it may result in a large amount of hardware. This is because current and future 1- and 2-D antenna arrays with several thousand elements are rather typical which implies that several thousand different BIFODELs would be required.

In this disclosure we present a wavelength-coded recirculating BIFODEL delay line apparatus (RC-BIFODEL) that is capable of addressing K different elements while requiring K/N, rather than K, different binary programmable fiberoptic delay lines, and thus it provides a very significant hardware savings.

While the above-cited references are instructive, there still remains a need to provide a recirculating binary fiberoptic delay line apparatus for time steering of very large array antennas. The present invention is intended to satisfy that need.

SUMMARY OF THE INVENTION

The present invention utilizes a plurality of fiberoptic delay lines which each provide a different delay that is separated into different optical wavelengths. The optical wavelengths are modulated to provide a plurality of optical signals which represented a number of delayed signals. These delayed signals are selectively recirculated to the fiberoptic delay lines to provide a greater number of delayed optical signals.

It is one object of the present invention, therefore to provide an improved recirculating binary fiberoptic delay line apparatus.

It is another object of the present invention to provide an improved recirculating binary fiberoptic delay line apparatus for time steering of array antennas.

It is still another object of the present invention to provide an improved recirculating binary fiberoptic delay line apparatus wherein an optical signal is intensity modulated according to the wavelength of the signal to be delayed.

It is yet another object of the present invention to provide an improved recirculating binary fiberoptic delay line apparatus wherein wavelength coding is utilized in a fiberoptic delay line to generate a plurality of optical output delay signals.

It is still a further object of the invention to provide an improved recirculating binary fiberoptic delay line apparatus wherein a very large number of optical delay signals can be generated with a small number of optic fiber segments.

These and other advantages, objects and features of the invention will become more apparent after considering the following description taken in conjunction with the illustrative embodiment in the accompanying drawing.

BRIEF DESCRIPTION OF THE DRAWING

The sole FIGURE is a block diagram of the recirculating binary fiberoptic delay line apparatus according to the present invention.

DESCRIPTION OF THE PREFERRED EMBODIMENT

For the following example, assume that the K elements of a one-dimensional array are partitioned into E sets of N elements each, such that $$K = NE \quad (2.1)$$

For the first set ($E=1$), the delay required by the ith element is equal to $$T_i = i\lambda \sin\theta / 2c = iT_1 \quad (2.2)$$

where $T_1$ is the delay of the first element of the first set which will be called the reference set. Equation 2.2 indicates that, as expected, the delay required for the ith element is i times the delay of the first element. Thus in principle, one can achieve the ith delay by "multiplying" the first delay i times. Delay multiplication generally implies recirculation, that is; the signal intended for the ith element is equivalent to the signal of the first element after recirculating it i times through the first delay line of the reference set. Thus, a single delay line capable of providing the delays required for the first element can be used in conjunction with recirculation to provide the delays for each element of the first set. In principle, this approach may be used for each of the E sets in conjunction with bias delays that differ from set-to-set. The critical point of this approach is to identify techniques in order to encode the signal differently for each passage through the delay line, so that the various delayed signal versions can be identified and separated. The major advantage of this approach is the hardware savings it provides because it requires only E delay lines plus the hardware required for recirculation.

One possible encoding scheme is wavelength encoding. Referring now to the sole FIGURE there is shown a block diagram of a recirculating binary fiberoptic delay line apparatus (RC-BIFODEL) which comprises a binary programmable fiberoptic delay line 10, an optical demultiplexer (DEMUX) 12 which is capable of separating N optical wavelengths, a parallel detector bank 14 with N detectors, a laser diode (LD) bank 16 with N-LDs each at a different optical wavelength $\lambda_i$, and an N-input optical multiplexer (MUX) 18. The DEMUX, LD bank, MUX are matched to each other, and the detectors are wavelength optimized. The input signal to the binary programmable fiberoptic delay line 10 is optical, at wavelength $\lambda_o$, and is intensity modulated according to s(t), the signal to be delayed. Under the assumption that the binary programmable fiberoptic delay line 10 is set for delay T, the intensity of the optical signal exiting the binary programmable fiberoptic delay line is proportional to $$s_1(t,T,\lambda) \sim s(t-T) \cos(2\pi ut/\lambda_o) \quad (2.3)$$

where u is the speed of light of the binary programmable fiberoptic delay line medium. This signal enters the DEMUX device which assigns it to the optical channel named $\lambda_o$. The output of this channel is then split into two parts. One part of the signal is used for the addressing of the first antenna element, and the other part of the signal is directed to the detector bank. The first detector of the detector bank 14 (i.e., the detector that is assigned to the $\lambda_o$ channel) responds to the modulation, rather than the optical carrier, and thus it yields an output that is proportional to s(t-T). This signal is used to intensity modulate the output of the first laser diode of the laser diode bank 14 at wavelength $\lambda_1$. This optical signal is then fed into the multiplexer (MUX) unit 18 whose output is fed back into the BIFODEL unit 10. Upon exiting the BIFODEL unit 10, the signal has undergone an additional delay T but is now carried by a different wavelength optical carrier (i.e., $\lambda_1$ rather than $\lambda_o$) and thus it can be described as $$s_2(t,T,\lambda) \sim s(t-2T) \cos(2\pi ut/\lambda_1) \quad (2.4)$$

Since the optical carrier of this signal is at wavelength $\lambda_1$ the DEMUX unit 12 assigns it at the second channel named $\lambda_1$. In a similar manner, the output of this channel is split with one part of the signal used for the addressing of the second antenna element, and the other part of the signal directed at the detector bank. The output of the second detector of the detector bank 14 (i.e., the detector that is assigned to the $\lambda_1$ channel) is proportional to s(t-2T) and is used to intensity modulate the output of the second laser diode of the laser diode bank 16 at wavelength $\lambda_2$. The resulting optical signal is then fed into the MUX unit 18 whose output is fed into the binary programmable fiberoptic delay line unit 10. This operation continues N times until the original input signal has been delayed by NT, with the understanding that each time the optical signal is recirculated, it is being carried by a different wavelength optical carrier. In this manner it is possible to separate the N delay signal versions. It is obvious that every time the binary programmable fiberoptic delay line is reset, the delay of all signals is also reset, which however are linearly related, that is; they are progressively increased.

The RC-BIFODEL apparatus allows for hardware savings which is proportional to N. The parameter N is determined by: (1) the number of channels in the MUX and DEMUX units; (2) the optical bandwidth of the BIFODEL; and (3) the acceptable signal-to-noise (SNR) or dynamic range (DR) loss due to noise accumulation which is induced because of signal recirculation. Commercially available MUX-DEMUX devices offer a channel capacity well above 20, however, experimental devices with optical wavelength spacing of about 13.5 Å have been demonstrated which implies that over 250 channel capacity is possible in the 1.2–1.6 $\mu$m region. The optical bandwidth of the binary programmable fiberoptic delay line is determined mainly by the bandwidth of the optical switches. Commercially available LiNbO$_3$-based 2×2 electrooptic switches support an optical bandwidth of well over 50 nm in either the 0.8 or 1.3 $\mu$,m band, which implies that 20 or more channels can be easily supported. Finally, in a binary programmable fiberoptic delay line with a balanced feedback loop, the signal-to-noise or dynamic range loss (in dB) due to the noise accumulation is proportional to logN, where N is the number of recirculations. Thus for N=20 the loss would be 13 dB, which is by no means untolerable as to prohibit the use of the described architecture.

The above discussions indicates that it can be easily expected to use an RC-BIFODEL with up to 20 recirculations which implies an overall hardware savings in excess of 95 percent. In conclusion, it may be seen that the wavelength-coded recirculating delay line architecture when incorporated in array antennas will result in hardware savings of well above an order of magnitude as compared to the hardware requirements of the linear case which requires K binary programmable fiberoptic delay lines.

Although the invention has been described with reference to a particular embodiment, it will be understood to those skilled in the art that the invention is capable of a variety of alternative embodiments within the spirit and scope of the appended claims.

What is claimed is:

1. A recirculating binary fiberoptic delay line apparatus for time steering of array antennas comprising in combination:

means for delaying an optical signal receiving an input optical signal, said optical delay means delaying said input optical signal by a predetermined delay T to provide a delayed output signal, means for demultiplexing receiving said delayed output signal, said demultiplexing means having a plurality of wavelength channels for separating signals by wavelength, each channel of said plurality of wavelength channels providing an output signal with a first and second part, said first part being applied to an element of said array antenna, a detector bank with a plurality of parallel detectors, said detector bank receiving said second part of said output signal and detecting the modulation thereon to provide a delay signal which is proportional to the delay on said delayed output signal, a laser diode bank with a plurality of laser diodes each operating at a different optical wavelength, said laser diode bank receiving said delayed output signal, said delayed output signal intensity modulates the first laser diode of said laser diode bank to provide a first optical signal, and, means for multiplexing a plurality of signals at different wavelengths receiving said first optical signal, said multiplexing means providing a multiplexed signal which is applied to said optical delaying means, said multiplexed signal is delayed in said optical delaying means and applied to said demultiplexing means wherein said multiplexed signal is separated into a wavelength channel according to the wavelength of said multiplexed signal, said demultiplexing means providing a second output signal wherein one part is applied to an element of said array antenna and a second part is recirculated through said detector bank, said laser diode bank, and said multiplexing means to said optical delaying means a predetermined number of times to generate a predetermined number of delayed signals.

2. A recirculating binary fiberoptic delay line apparatus as described in claim 1 wherein said plurality of wavelength channels equals the number of delayed signals to be generated.

3. A recirculating binary fiberoptic delay line apparatus as described in claim 1 wherein said plurality of parallel detectors is equal to the number of said plurality of wavelength channels.

4. A recirculating binary fiberoptic delay line apparatus as described in claim 1 wherein said plurality of laser diodes is equal to the number of said plurality of parallel detectors.

5. A recirculating binary fiberoptic delay line apparatus as described in claim 1 wherein said delayed output signal from the detector bank is utilized to intensity modulate one laser diode of said plurality of laser diodes to provide a delayed optical at an optical wavelength which corresponds to the laser diode selected to be modulated.

* * * * *